United States Patent
Ehret

[15] 3,638,453
[45] Feb. 1, 1972

[54] RETAINER SEAL FOR GEAR-TYPE FLEXIBLE COUPLINGS

[72] Inventor: John B. Ehret, 20860 Greenwood Drive, Olympia Fields, Ill. 60461

[22] Filed: Sept. 28, 1970

[21] Appl. No.: 76,005

[52] U.S. Cl. ................................................64/9 R, 64/4
[51] Int. Cl. ..........................................................F16d 3/18
[58] Field of Search...................................................64/4, 9 R

[56] References Cited

UNITED STATES PATENTS

| | | | |
|---|---|---|---|
| 2,974,501 | 3/1961 | Kaufman et al. | 64/9 |
| 3,298,198 | 1/1967 | Winkler | 64/9 |
| 3,530,685 | 9/1970 | Ehret | 64/9 X |

*Primary Examiner*—Kenneth W. Sprague
*Attorney*—Hofgren, Wegner, Allen, Stellman & McCord

[57] ABSTRACT

A retainer for securing gear-type coupling sleeves and hubs together against endwise separation. A tapered key of flexible material such as nylon, polyurethane or other plastic which has physical characteristics that permit the key to be pushed endwise, with its smallest end first, through an exterior opening in the coupling sleeve into a complementarily tapered keyway groove between the coupling parts, and to be pulled out of the groove when desired. The key fills the groove, has ends mated, and acts as a key and a seal against loss of lubricant from within the coupling parts.

19 Claims, 3 Drawing Figures

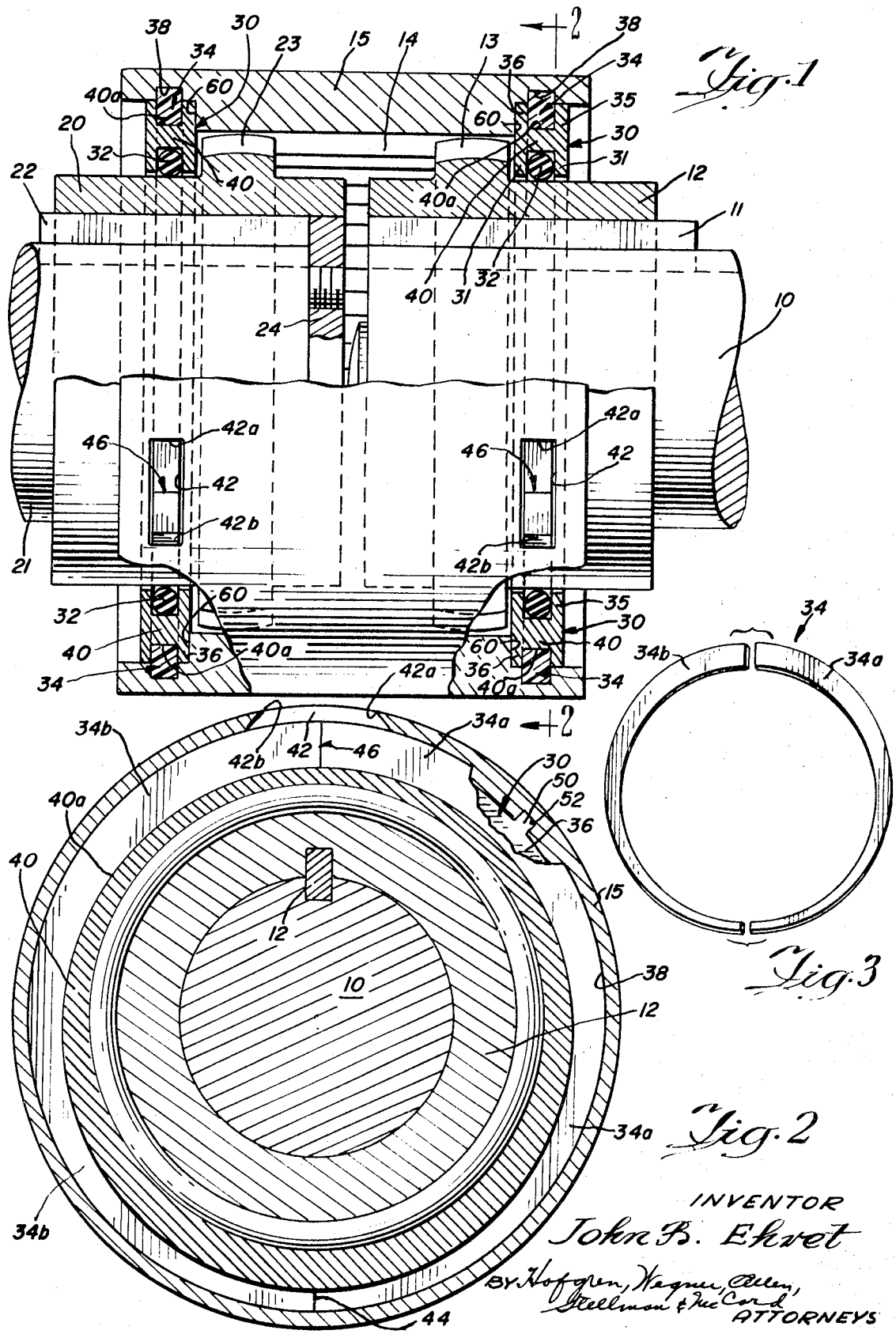

RETAINER SEAL FOR GEAR-TYPE FLEXIBLE COUPLINGS

BACKGROUND AND SUMMARY OF THE INVENTION

This invention relates to seals and retainers in couplings for rotating shafts accommodating misalignment, particularly gear-type couplings with myriad uses including drives between motors and driven elements. A great many such couplings are used in steel mills, rolling mills, strip-treating lines and general power transmission systems.

In steel mills, spindles with flexible couplings at each end are used to connect the mill rolls with the driving gear reducers or motors. These couplings have used a steel waffle spring to retain the coupling parts together, the spring being so named because of its undulating appearance. The steel waffle spring has proven difficult to insert because the application of pushing force can cause the spring to buckle and break at one of the high or low points of the wave shape. Repeated buckling has resulted in failure during removal when the spring is in tension. This can occur without contributory rusting. The wave shape of the waffle spring also permits the entry of foreign matter such as dirt and mill scale, contributes to binding of the spring in the mating grooves, and results in the necessity of applying excessive force, causing breakage when trying to pull the spring out. The springs are also subject to rusting and often break in the groove between the coupling parts, making it practically impossible to extract them. In such instances, the steel mill personnel generally use an oxyacetylene torch to burn the coupling in two rather than delay the continued production of the rolling mill involved. A new coupling has to be substituted in such instances, resulting in considerable expense. All couplings of the gear type have parts which may be subject to conditions of atmosphere and surroundings which can cause split rings or waffle springs to deteriorate and cause difficulty when it is desired to disassemble the coupling for maintenance or changes.

A general disclosure of the known gear-type couplings may be obtained from the following U.S. patents:

| Patent No. | Inventor | Issue Date |
| --- | --- | --- |
| 2,510,414 | R. S. Philbrick | June 6, 1950 |
| 2,918,809 | R. A. Miller | Dec. 29, 1959 |
| 2,974,501 | S. S. Kaufman et al. | Mar. 14, 1961 |
| 3,174,302 | S. W. Pomper | Mar. 23, 1965 |
| 3,313,124 | L. Filepp | Apr. 11, 1967 |

My copending application Ser. No. 761,968 filed Sept. 24, 1968, entitled "Retainer-Seal For Gear Type Flexible Couplings" discloses a retainer seal which provides a solution for these problems. In that disclosure, a plastic key is disposed in a mating annular groove between coupling parts in a gear-type coupling wherein the key is inserted into the groove endwise and extracted by endwise pull. Should the key break, another key of similar section may be used to push the broken part out of the groove, thereby maintaining the coupling always in a condition to be assembled and disassembled. Further, the key is so made that it may provide a seal against the loss of lubricant from within the coupling, eliminating the necessity for additional separate seals. The key has a generally uniform cross-sectional shape and the groove has walls forming a generally uniform cross-sectional shape mating the cross-sectional shape of the key.

The present invention contemplates the utilization of a plastic key in a mating groove in a gear-type coupling of the character described. The key is tapered lengthwise thereof and is inserted smallest end first into a groove which is tapered in cross-sectional shape mating the cross-sectional shape of the tapered key. The key, when in full retaining position, is wedged within the groove to provide an improved seal.

In the preferred embodiment of the invention, the groove for receiving the tapered key extends 360° about the coupling parts and has its widest cross-sectional portion diametrically disposed 180° opposite its narrowest cross-sectional portion, with the groove tapering generally uniformly from its widest portion to its narrowest portion. The key comprises a pair of generally identical elongated flexible tapered members for progressive insertion into the groove to extend about the coupling parts in opposite directions, approximately 180° for each key member.

Other features and advantages of the invention will become apparent from the following detailed description taken in connection with the accompanying drawings.

DESCRIPTION OF THE DRAWINGS

FIG. 1 is a quarter-sectional broken view through a gear-type coupling embodying the present invention;

FIG. 2 is a sectional view through the coupling of FIG. 1 taken substantially along the line 2—2 thereof and angularly oriented approximately 100° from that shown in FIG. 1 so that the groove access opening is disposed at the top of the drawing; and FIG. 3 is a perspective view, on a reduced scale, of the retaining key of the present invention, the key comprising a pair of generally identical tapered members.

DETAILED DESCRIPTION OF THE INVENTION

The structure of a gear-type coupling is shown in FIGS. 1 and 2, the main components being machined from forged steel components. A first shaft 10 has a key 11 coupling the same into a hub 12. The hub 12 is equipped with gear teeth 13 in mesh with teeth 14 internally formed in a sleeve 15. A second hub 20 is connected to a second shaft 21 as by a key 22. The hub 20 also has spline teeth 23 in mesh with a continuation of the teeth 14 in the sleeve 15 so that the hub and sleeve will turn together. A thrust plate 24 is pressed into the end of hub 20, and receives forces from any floating motion of shaft 10 and hub 12. The space between the hubs within the coupling and around the gear teeth may be filled with grease. The assembly of coupling hubs and sleeves is accomplished in a fashion to seal the lubricant within the coupling and keep the parts of the coupling in proper position for power transmission.

The disclose construction for exemplifying the concepts of the present invention includes a 360° continuous ring, generally designated 30, between each of the hubs 12, 20 and sleeve 15. Although both of the rings 30, and associated components, at the left- and right-hand ends of sleeve 15 (as seen in FIG. 1) are identical, complete reference numerals will be applied only to the upper right-hand position of FIG. 1 so as to avoid unnecessarily cluttering the drawings.

Each ring 30 has the shape of a capital H in section and forms a support for the key retainer of the present invention, to be described in greater detail hereinafter. Each H-shaped ring has clearance with the coupling parts so as to be easily positioned between them. Between the legs 31 on the ID of each ring is placed an O-ring seal 32 so that lubricant will not pass the ID of the ring and to permit flexing between the respective hub and the ring. A plastic key retainer, generally designated 34, occupies the space between the legs 35 and 36 on the top of each ring as well as a groove 38 formed on the interior of the sleeve 15. The groove 38 on the sleeve has U-shaped walls positioned opposite the U-shaped walls defined between the legs 35 and 36 on the OD of the ring 30 whereby an enclosed groove is formed 360° about the coupling parts with the inside of the legs 35, 36 of the ring 30 and the sidewalls of the sleeve groove 38 defining flat sidewalls generally perpendicular to the axis of shafts 10, 21.

The present invention contemplates tapering the groove and positioning within the tapered groove mating tapered key members. To this end, the bridge portion 40 of each ring 30 is formed such that the annular surface 40a on the outside thereof, within the groove, is eccentric relative to the bottom of the groove 38 in the sleeve 15. This eccentricity and the resulting tapered groove are best seen by reference to FIG. 2.

As best seen in FIG. 3, the key retainer 34 of the exemplary form of the invention comprises a pair of generally identical elongated tapered members 34a and 34b for progressive insertion into the tapered groove to extend about the coupling parts in opposite directions approximately 180° for each key member, as best seen in FIG. 2.

Access to the groove is through an opening 42 in the sleeve 15 generally of the width of the groove and having end walls 42a and 42b which may be about 23°–25° in circumferential length apart. The key members 34a, 34b are of plastic material, so that they are flexible, and are insertable smallest end first through the opening 42 by endwise progressive pushing of the key members into the groove in opposite directions. The small end of one of the key members is started in through the opening 42 and eventually will find its way around the coupling approximately 180° from the opening. The other key member then is started through the opening 42 by endwise progressive pushing and eventually will find its way around the coupling until the small end thereof abuts against the small end of the first-to-be-inserted key member, as at 44 in FIG. 2. The key members 34a, 34b are dimensioned lengthwise thereof so that the large ends of the key members will be in tight abutting relationship, as at 46 in FIG. 2, below the access opening 42. With the key members 34a, 34b in their respective full retaining positions shown in FIG. 2, the key members are wedged within the tapered groove to provide a tight seal.

The ring 30, as shown in FIG. 2, may be provided with an outwardly protruding tab 50, as on the marginal edge of the leg 36 thereof, receivable in a complementary groove 52 in the sleeve 15 to insure that the ring is properly positioned so as to orient the widest part of the groove between the ring and the sleeve 15 in alignment with the access opening 42.

The retaining key members 34a, 34b preferably are formed of plastic materials, polyurethane and nylon having been found satisfactory. The choice of materials may vary with the atmospheric conditions and the temperature, and surrounding corrosive dust and abrasive conditions in which the coupling must operate, as well as the centrifugal force to which the coupling will be subjected, which tends to throw lubricant out of the coupling. Softer materials provide a better seal.

The rings 30 may be fabricated of metallic or plastic material, or the rings may be formed by plastic-coated metal. In certain situations, particularly where there might be considerable misalignment between the shafts 10 and 21, there may be a tendency to destroy the seal afforded by the flexible plastic key retainers 34, as by a "pumping" action as the misaligned shafts rotate. It has been found that by fabricating the rings 30 of solid plastic material or of plastic-coated metal, or the like, an improved seal may be provided between the legs 36 of the respective rings 30 and the adjacent surface portions 60 of the sleeve 15. In essence, the leg 36 of each ring 30 provides a continuous 360° marginal portion which, if fabricated of solid plastic, plastic-coated metal, or the like, forms a tight seal between the ring and the sleeve due to the flexible key retainer 34 sandwiching the leg 36 of the ring between the key retainer and the adjacent complementary surface portion 60 of the sleeve 15.

Generally, the principle embodied in using the H-ring, O-ring and retainer seal can be applied to retaining and joining other mechanical devices such as bearings, shafts, etc. In addition, it should be emphasized that the H-shaped ring is but an exemplary embodiment in which the invention has utility. The tapered groove-tapered retaining seal concept of the present invention is equally applicable as a retaining means directly between the shaft hubs and the sleeve, without using the H-shaped ring, as well as between many other appropriate mechanical devices.

The foregoing detailed description has been given for clearness of understanding only and no unnecessary limitations should be understood therefrom as some modifications will be obvious to those skilled in the art.

I claim:

1. In a gear-type flexible coupling adapted to compensate for misalignment of and transmission of power between rotating shafts, such coupling having a sleeve part and hub parts for such shafts, means for retaining the sleeve and hub parts in position for transmission of power, comprising:
    at least one elongated flexible key the cross-sectional shape of which is tapered lengthwise thereof;
    means forming at least one annular groove between such parts to be retained in position, such groove being so positioned as to be separated intermediately upon endwise separation of such coupling parts, such groove being tapered in cross-sectional shape mating the cross-sectional shape of said key; and
    means forming an opening through the exterior of the sleeve at the widest portion of said groove extending lengthwise of the groove a few degrees and at least of the groove width, said opening providing access for the key to be endwise progressively inserted smallest end first into the groove to extend about the coupling parts thereby retaining such coupling parts against endwise separation.

2. Means as specified in claim 1 wherein said groove extends 360° about the coupling parts and has a wide cross-sectional portion diametrically disposed 180° opposite a narrow cross-sectional portion with the groove tapering generally uniformly from said wide cross-sectional portion to said narrow cross-sectional portion.

3. Means as specified in claim 2 wherein said key comprises a pair of generally identical elongated flexible tapered members for progressive insertion into the groove in opposite directions to extend about the coupling parts approximately 180° for each key member.

4. Means as specified in claim 3 wherein the cross-sectional shapes of said key members generally mate with the respective cross-sectional shape of said groove so that the key members are snugly wedged in said groove when the key members are in their full retaining positions.

5. Means as specified in claim 4 wherein adjacent ends of said key members are in tight abutment when in their full retaining positions.

6. Means as specified in claim 2 wherein said groove is generally rectangular in cross-sectional shape defined by a pair of generally parallel opposite flat sidewalls disposed generally perpendicular to the axis of rotation of said shafts and parts and inner and outer opposite annular walls, said annular walls being eccentric relative to each other.

7. Means as specified in claim 6 wherein one of said annular walls is concentric to the axis of rotation of said shafts and parts.

8. Means as specified in claim 6 wherein said outer annular wall is concentric to the axis of rotation of said shafts and parts.

9. Means as specified in claim 1 wherein the walls forming said annular groove are partially in said sleeve and in a metallic ring abutting said sleeve and hub so that the key in said groove retains the hub and sleeve against endwise separation.

10. Means as specified in claim 1 wherein said key is shaped and of a length to substantially fill the groove providing a barrier against passage of lubricant past the key and thus out of the coupling.

11. Means as specified in claim 1 including a ring disposed between each hub and the sleeve part, each ring having a cross-sectional H-shape with a seal within the legs of the H-shape adjacent the hub, and said flexible key reposes between the legs of the H-shape adjacent the sleeve part and in the adjacent sleeve part.

12. Means as specified in claim 11 wherein at least one of the legs of the H-shape adjacent the sleeve part has a continuous 360° marginal portion formed of plastic and held by said flexible key tightly against a complementary adjacent portion of said sleeve part to provide a seal between said leg of the H-shape and the adjacent portion of the sleeve part.

13. Means as specified in claim 11 wherein said H-shaped ring is fabricated of plastic-coated metal with a continuous 360° marginal portion thereof held by said flexible key tightly against a complementary adjacent portion of said sleeve part to provide a seal between the ring and sleeve part.

14. In a device having a sleeve part and an annular part to be retained in position in the sleeve part, means for retaining the sleeve part and annular part together in operative position, comprising:

at least one elongated flexible key the cross-sectional shape of which is tapered lengthwise thereof;

means forming at least one annular groove between such parts to be retained in position, such groove being so positioned as to be separated intermediately upon endwise separation of such sleeve and annular parts, such groove being tapered in cross-sectional shape mating the cross-sectional shape of said key; and means forming an opening through the exterior of the sleeve at the widest portion of said groove extending lengthwise of the groove a few degrees and at least of the groove width, said opening providing access for the key to be endwise progressively inserted smallest end first into the groove to extend about the annular part thereby retaining such sleeve and annular parts against endwise separation.

15. In a device having a sleeve part and an annular part to be retained in position in the sleeve part, means for retaining the sleeve part and annular part together in operative position, comprising:

at least one elongated flexible key;

a ring disposed between the sleeve part and the annular part, said ring having a continuous 360° marginal portion formed of plastic for sealing against a complementary adjacent portion of said sleeve part;

means establishing a seal between the ring and said annular part;

means preventing endwise separation of said ring and annular part;

means forming at least one annular groove between the ring and the sleeve part, such groove being so positioned as to be separated intermediately upon endwise separation of said ring and sleeve part; and means forming an opening through the exterior of said sleeve part extending lengthwise of the groove a few degrees and at least the width of the groove, said opening providing access for the key to be inserted into the groove to extend 360° about said parts thereby retaining the parts and ring against endwise separation, said key holding said plastic portion of the ring tightly against the complementary adjacent portion of said sleeve part.

16. Means as specified in claim 15 wherein said ring has a cross-sectional H-shape with a seal within the legs of the H-shape adjacent the annular part, and said flexible key reposes between the legs of the H-shape adjacent the sleeve part and in the adjacent sleeve part.

17. Means as specified in claim 16 wherein at least one of the legs of the H-shape adjacent the sleeve part has a continuous 360° marginal portion formed of plastic and held by said flexible key tightly against a complementary adjacent portion of said sleeve part to provide a seal between said leg of the H-shape and the adjacent portion of the sleeve part.

18. Means as specified in claim 17 wherein said one leg of the H-shaped ring is sandwiched between said flexible key and the adjacent portion of said sleeve part.

19. Means as specified in claim 16 wherein said H-shaped ring is fabricated of plastic-coated metal with a continuous 360° marginal portion thereof held by said flexible key tightly against a complementary adjacent portion of said sleeve part to provide a seal between the ring and sleeve part.

* * * * *

UNITED STATES PATENT OFFICE
CERTIFICATE OF CORRECTION

Patent No. 3,638,453     Dated February 1, 1972

Inventor(s) John B. Ehret

It is certified that error appears in the above-identified patent and that said Letters Patent are hereby corrected as shown below:

Column 1, line 46, change "S.W. Pomper" to --A.W. Pomper--.

Column 2, line 61, change "top" to --O.D.--.

Signed and sealed this 13th day of June 1972.

(SEAL)
Attest:

EDWARD M. FLETCHER, JR.
Attesting Officer

ROBERT GOTTSCHALK
Commissioner of Patents